United States Patent [19]

Wagner et al.

[11] Patent Number: 4,946,364
[45] Date of Patent: Aug. 7, 1990

[54] APPARATUS FOR MANUFACTURING REINFORCED POLYMERIC TUBING

[75] Inventors: Hans-Dieter Wagner, Eggingen, Fed. Rep. of Germany; Heinrich Holzer, Niederglatt, Switzerland

[73] Assignee: RCM, Ltd., Rubber Consulting & Machinery, Höri-Zürich, Switzerland

[21] Appl. No.: 359,851

[22] Filed: May 31, 1989

[51] Int. Cl.⁵ .............................................. B29C 47/02
[52] U.S. Cl. .................................. 425/72.1; 425/113; 425/133.1; 425/326.1; 425/462; 425/466
[58] Field of Search ..................... 425/72.1, 113, 114, 425/133.1, 326.1, 462, 466; 264/209.3, 210.2; 156/500; 428/36.91

[56] References Cited

U.S. PATENT DOCUMENTS

| | | | |
|---|---|---|---|
| 2,760,230 | 8/1956 | Van Riper | 425/113 |
| 2,874,411 | 2/1959 | Berquist | 425/114 |
| 2,928,123 | 3/1960 | Ramsey | 425/113 X |
| 3,058,493 | 10/1962 | Muller | 138/122 |
| 3,159,877 | 12/1964 | Orsini | 425/113 |
| 3,365,750 | 1/1968 | Donald | 425/133.1 |
| 3,405,426 | 10/1968 | Donald | 425/114 |
| 3,520,966 | 7/1970 | Soffiantini | 264/173 |
| 3,538,547 | 11/1970 | Drabb | 425/133.1 X |
| 3,694,131 | 9/1972 | Stuart | 425/461 |
| 3,697,209 | 10/1972 | Schiesser | 425/109 |
| 3,773,449 | 11/1973 | Hager | 425/114 |
| 3,856,447 | 12/1974 | Schiesser | 425/461 X |
| 4,081,232 | 3/1978 | Pemberton et al. | 425/113 X |
| 4,362,488 | 12/1982 | Casals et al. | 425/114 X |
| 4,465,449 | 8/1984 | Hornbeck | 425/133.1 X |
| 4,548,567 | 10/1985 | Missout | 425/133.1 X |
| 4,585,407 | 4/1986 | Silver et al. | 425/114 |
| 4,657,496 | 4/1987 | Ozeki et al. | 425/133.1 X |
| 4,770,620 | 9/1988 | Steinecke et al. | 425/462 X |

FOREIGN PATENT DOCUMENTS

| | | | |
|---|---|---|---|
| 2332518 | 1/1975 | Fed. Rep. of Germany | 425/133.1 |
| 1319084 | 6/1987 | U.S.S.R. | 425/133.1 |

Primary Examiner—Richard L. Chiesa
Attorney, Agent, or Firm—Renner, Kenner, Greive, Bobak, Taylor & Weber

[57] ABSTRACT

Apparatus (10) for manufacturing polymeric tubing (T) containing a reinforcing material (M) enclosed between first and second polymeric compounds including an extrusion head (11) having an elongate housing (14), a bore extending from a front end (15) of the housing to a rear end (16) of the housing, a rear material guide sleeve (50) fixed in the bore proximate the rear end of the housing and having a channel (51) for passing reinforcing material, a forward material guide sleeve (36) fixed in the bore proximate the front end of the housing for radially outwardly constraining passing reinforcing material, a center pin (76) extending substantially the length of the housing and located centrally of the bore thereof, a flow pipe (60) extending from the rear material guide sleeve and forming an inner channel (90) supplying a first polymeric compound, means for adjusting the concentricity of the flow pipe relative to said center pin means, an outer channel (45) supplying a second polymeric compound, and adjustable dies (85,101) controlling the interior and exterior dimensions of the first and second polymeric compounds as the polymeric tubing is extruded.

20 Claims, 2 Drawing Sheets

APPARATUS FOR MANUFACTURING REINFORCED POLYMERIC TUBING

TECHNICAL FIELD

Generally, the invention relates to apparatus for the manufacture of reinforced polymeric tubing. More particularly, the invention relates to apparatus for the manufacture of tubing composed of an inner polymer, a reinforcing material, and an outer polymer, which may be the same as or different from the inner polymer. More specifically, the invention relates to apparatus including an improved injection head which is capable of continuously extruding precision tubing consisting of an inner polymer, a reinforcing material, and an outer polymer, which may be the same as or different from the inner polymer.

BACKGROUND ART

Reinforced polymeric tubing or hosing has long been manufactured for a variety of purposes. Such tubing or hosing is particularly useful in applications where the tubing or hosing is subjected to the action of internal forces such as may be caused by the pressure due to the presence of internal fluids. One common use of such tubing or hosing is in the cooling system of motor vehicles to circulate pressurized fluid between the major operative components of the cooling system.

Tubing or hoses containing a reinforcing material, especially fabric reinforcing materials, are in many instances still manufactured according to techniques which have been known in the industry for many years. These conventional techniques contemplate initially the manufacture of a core which may be molded or otherwise formed to serve as the internal member of the tubing or hose. In a subsequent working operation and normally with the aid of special equipment there is applied the reinforcing material, which may be formed of a fabric band or fabric fibers, to the outer surface of the core. Thereafter, the core and reinforcing material are commonly passed through an injection head which applies an outer polymeric covering over the reinforcing material. In instances where a plurality of layers or types of reinforcement are employed, the operations of the lay up of the reinforcing material and the molding of an outer layer of polymer thereover may be repeated, as necessary. In order to maintain sufficient uniformity in the application of different layers, it is often necessary to draw the inner polymeric material or core onto an elongate mandrel prior to the application of reinforcing layers to the core. In many instances to obtain good bonding between reinforcing material and polymeric components it has been necessary to apply adhesives between the application of different layers. In some instances, one or more vulcanizing operations are also necessitated. As has been appreciated by persons skilled in the art, these conventional fabrication processes require a variety of different types of equipment, the carrying out of a number of processing stages, and an otherwise time consuming procedure, all of which contributed to extremely high production costs.

As a result, recent developments in the manufacture of reinforced polymeric tubing or hosing have been directed generally to apparatus capable of practicing a process wherein all components are assembled in a single working operation, such as a single pass through an injection head. Such single step continuous processing may or may not be coupled with a continuous vulcanizing process depending upon the configuration of the final product, the particular polymeric materials employed, and other considerations.

Recent developments have been directed largely to the combination in an extrusion head of at least two layers of polymeric material with suitable reinforcing material interposed therebetween. The reinforcing material may be applied as a single spiral layer or by employing a plurality of segments of short circumferential extent which may be laid up in circumferentially overlapping relationship. While efforts have been made to adjust the thickness of the outer polymeric layer and its concentricity with respect to the tubing or hosing, little has been done in regard to adjusting the thickness or concentricity of the inner polymeric layer due to the inaccessibility of the die and other components directly involved in forming the inner polymeric layer. A particular problem which has not been fully solved by the prior art is the capability of adjusting the thickness of the inner polymeric layer to achieve desired specifications while the extrusion head is in operation. It is appreciated that the thickness and circumferential uniformity of the inner polymeric layer is of great significance in producing tubing or hosing which meets stringent performance specifications. To Applicant's knowledge no existing extrusion heads have successfully met all of these operating parameters while providing a unit which may be readily dismantled for cleaning or servicing or to install dies producing tubing or hosing having different dimensional characteristics.

DISCLOSURE OF THE INVENTION

Therefore an object of the present invention is to provide apparatus for manufacturing polymeric tubing containing a reinforcing material which permits adjustment for the thickness and circumferential uniformity of an inner polymeric compound and an outer polymeric compound. Another object of the present invention is to provide such apparatus wherein the thickness and circumferential uniformity of the outer polymeric compound may be adjusted externally of the extrusion head while the extruder is in operation. Still another object of the present invention is to provide such apparatus wherein the thickness of the inner polymeric compound may be varied by an adjustment made from the rear of the extruder head while the extruder head is in operation. A still further object of the invention is to provide such apparatus wherein the circumferential uniformity of the inner polymeric compound may be adjusted by altering the setting of a plurality of adjusting members.

Another object of the present invention is to provide an extrusion head for polymeric tubing containing a reinforcing material enclosed between first and second polymeric compounds, wherein the reinforcing material may be introduced through channels in a rear material guide sleeve and a forward material guide sleeve without the necessity for guiding or aligning elements within the channels. Still another object of the present invention is to provide such an extrusion head wherein the rear material guide sleeve and the forward material guide sleeve may be readily removed rearwardly of the extrusion head for cleaning extrudite from interiorly of the extrusion head. Still a further object of the present invention is to provide such an extrusion head wherein the extruder barrels of the apparatus are positioned perpendicular to the extrusion head housing and with the extruder screws being proximate thereto such that they are accessible for cleaning from interiorly of the head with the material guide sleeves removed without disassembling the head from the barrels.

Yet another object of the invention is to provide apparatus for manufacturing polymeric tubing containing a reinforcing material enclosed between first and second polymeric compounds wherein the extruder head can be of relatively compact longitudinal dimensions such that the extruder barrels may be located a short distance from the dies to allow a higher pressure of the compound passing through the dies due to lesser resistance and exact control and adjustment of the compound temperature due to the relatively short flow channels, thereby providing the possibility of more consistent, optimum performance of the die components.

Yet a further object of the invention is to provide an extrusion head for polymeric tubing containing a reinforcing material enclosed between first and second polymeric compounds having a center pin with a throughbore for selectively supplying a fluid such as compressed air internally of the extruded polymeric material for maintaining its configuration during subsequent operating steps such as a continuous cure. Still another object of the invention is to provide such apparatus which remains relatively inexpensive, can be easily adjusted, maintained and serviced as indicated above and otherwise, and which employs reliable elements with an absence of highly sophisticated controls or components which might be prone to operating problems under the extended operating cycles of the equipment. Still a further object of the present invention is to provide such apparatus which is capable of accommodating the rigors of a factory environment without the necessity for undue service and in which such servicing, repair, cleaning, run-in and adjustment of the equipment as is normally required may be readily effected without participation of highly trained technicians.

In general, the present invention contemplates apparatus for manufacturing polymeric tubing containing a reinforcing material enclosed between first and second polymeric compounds including an extrusion head having an elongate housing, a bore extending from a front end of the housing to a rear end of the housing, a rear material guide sleeve fixed in the bore proximate the rear end of said housing and having a channel for passing reinforcing material, a forward material guide sleeve fixed in the bore proximate the front end of the housing for radially outwardly constraining passing reinforcing material, a center pin extending substantially the length of the housing and located centrally of the bore thereof, a flow pipe extending from the rear material guide sleeve and forming an inner channel supplying a first polymeric compound, means for adjusting the concentricity of said flow pipe relative to the center pin, an outer channel supplying a second polymeric compound, and adjustable dies controlling the interior and exterior dimensions of the first and second polymeric compounds, as the polymeric tubing is extruded.

PREFERRED EMBODIMENT FOR CARRYING OUT THE INVENTION

Figure 1:
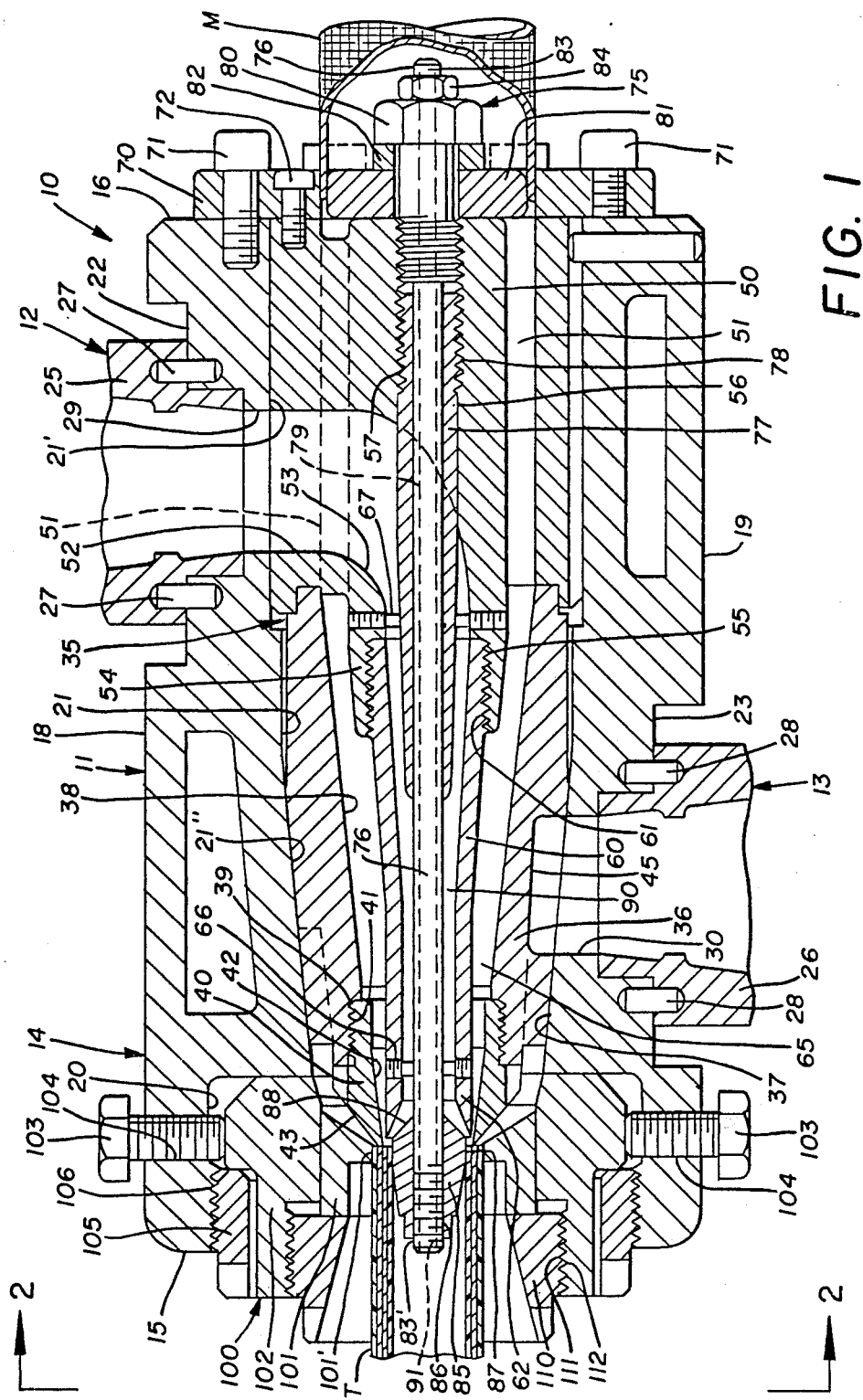
FIG. 1 is a longitudinal vertical section through an extrusion head according to the concepts of the present invention for manufacturing reinforced polymeric tubing taken substantially along the line 1—1 of FIG. 2 and showing fragmentary interconnections to a pair of extruder barrels.
Figure 2:
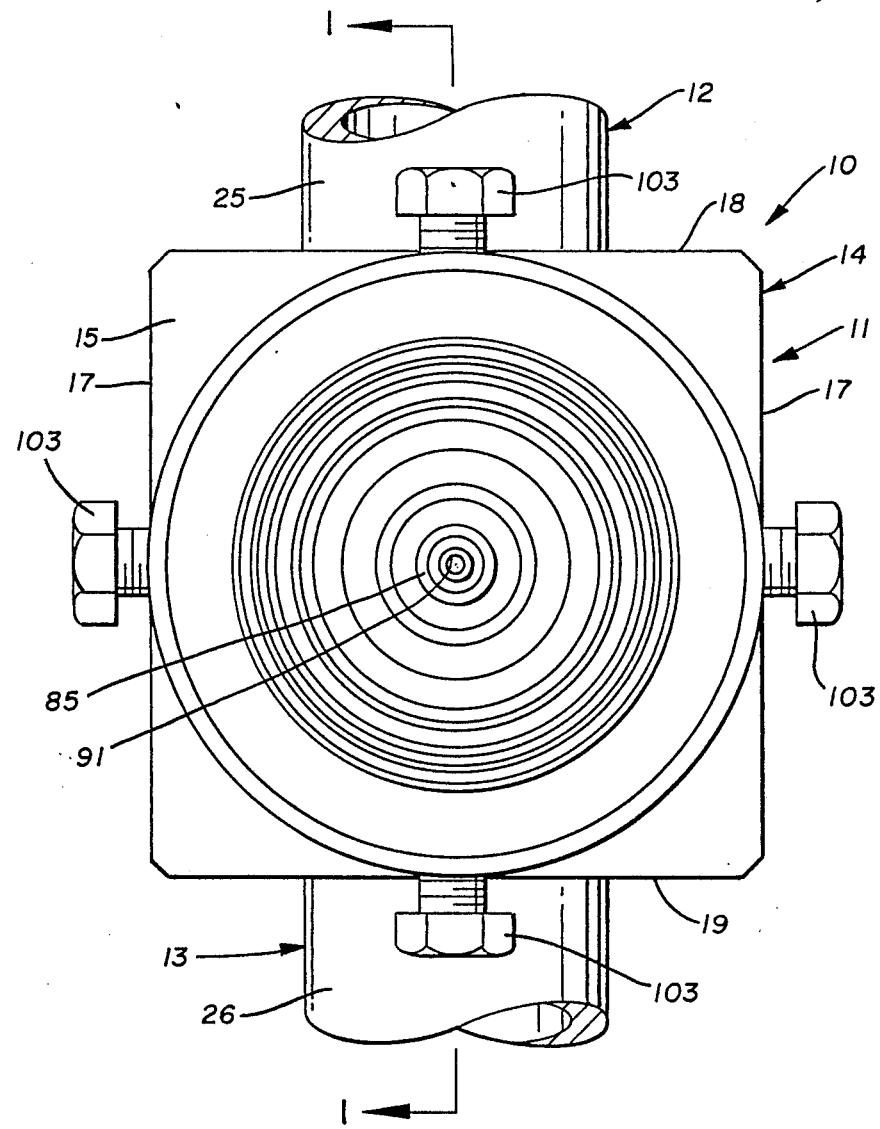
FIG. 2 is a front elevational view of the extrusion head of FIG. 1, taken substantially along the line 2—2 of FIG. 1.

Exemplary apparatus for the manufacture of reinforced polymeric tubing embodying the concepts of the present invention is generally indicated by the numeral 10 in FIGS. 1 and 2 of the drawings. The primary component of apparatus 10 in the context of the present invention is an extrusion head, generally indicated by the numeral 11. Servicing the extrusion head 11 with a controlled supply of plasticized polymeric materials are two fragmentarily depicted extruders, generally indicated by the numerals 12 and 13, which may contain the same or different compounds and may be any of a variety of different types of extruders known in the art.

The extrusion head 11 has as the main body member to which the extruders 12, 13 are attached, a housing, generally indicated by the numeral 14. As shown, the housing 14 is a somewhat elongate generally rectangular member. The housing 14 has a front end 15 and a spaced substantially parallel rear end 16 (FIG. 1). Disposed between and connecting the ends 15, 16 are a pair of side surfaces 17, a top surface 18 and a bottom surface 19, as best seen in FIG. 2.

The front end 15 of housing 14 has a relatively large bore 20 for a purpose to be described hereinafter. The housing 14 also has a variably dimensioned throughbore 21 which extends from the rear end 16 to the bore 20 in the front end 15. As shown, the throughbore 21 has a rearward constant diameter portion 21' and a forward tapered portion 21". The top surface of housing 14 has a recess 22 and the bottom surface 19 has a recess 23 which receive the extruders 12 and 13, respectively, and particularly the barrels 25 and 26 thereof, respectively. The barrels 25 and 26 are preferably substantially perpendicularly oriented relative to the housing 14 and may be aligned by virtue of pins 27 and 28 and otherwise attached to housing 14 in conventional manner. The screws (not shown) of the extruders 12, 13 are positioned in the barrels 25 and 26 and due in part to the recesses 22, 23 repose proximate to the top surface 18 and bottom surface 19 of housing 14 or even within the confines of these surfaces 18, 19 of the housing 14. The housing 14 has bores 29 and 30 within the recesses 22, 23, respectively, which communicate with the throughbore 21 of housing 14 to join it with the interior of the barrels 25, 26 of the extruders 12, 13.

A polymeric compound and reinforcing guide assembly, generally indicated by the numeral 35, is positioned interiorly of the housing 14 and resides within the throughbore 21. The guide assembly 35 includes a forward material guide sleeve 36 which has a tapered outer circular surface 37 which resides in and interengages with the tapered portion 21" of throughbore 21. Forward material guide sleeve 36 has a tapered inner surface 38 which terminates in an interior threaded portion 39 at the front end thereof. Extending axially forwardly of the forward material guide sleeve 36 is a material guide bushing 40. The material guide bushing 40 has outer threads 41 at its rear end that engage the threaded portion 39 of the guide sleeve 36 for selective attachment and detachment. Material guide bushing 40 has an inner surface 42 which tapers radially inwardly as it extends axially forwardly of the housing 14. The radially outer side of material guide bushing 40 includes a radially inwardly beveled surface 43.

The outer polymeric material of the tubing to be manufactured employing the extrusion head 11 is supplied via the extruder 13 and the extruder barrel 26 to the bore 30 of housing 14. The outer polymeric material is forced into an outer polymer channel 45 which is formed in the radially outer surface of the forward material guide sleeve 36. The outer channel 45 is bounded outwardly by the tapered portion 21" of the throughbore 21 and proceeds axially from approximately medially of the axial length of forward material guide sleeve 36 to the axial forward extent of throughbore 21 and to a position outwardly of the material guide bushing 40 and particularly beveled surface 43.

The polymeric component and reinforcing material guide assembly 35 has positioned rearwardly of the forward material guide sleeve 36 a rear material guide sleeve 50 positioned within the constant diameter portion 21' of throughbore 21 of housing 14. The rear material guide sleeve 50 has a rear material guide channel 51 which is a segment of an annulus formed in guide sleeve 50 and is circumferentially continuous except for a discontinuous portion in and proximate to an opening 52 which directly communicates with the bore 29 of housing 14. The opening 52 in guide sleeve 50 is generally radially oriented at the surface, merges into a curved portion 53, and transcends into an axially oriented mouth 54 directed radially of housing 14.

The mouth 54 of guide sleeve 50 has internal threads 55 for selective attachment of an inner flow pipe 60 which projects axially outwardly of the mouth 54 concentrically of the bore 20 in housing 14 and substantially the length of the forward material guide sleeve 36. The inner flow pipe 60 is shown with threads 61 which engage the threads 55 of the guide sleeve 50. The forward extremity of the flow pipe 60 tapers to a point 62, such that the outer surface of the flow pipe 60 cooperates with inner surface 38 of forward material guide sleeve 36 and the inner surface 42 of guide bushing 40 to define a tapering reinforcing material guide channel 65 which communicates directly at its rear extremity with the channel 51. It will thus be appreciated that exemplary reinforcing material M introduced to rear material guide sleeve 50 in an unclosed circular configuration may be threaded forwardly around the opening 52 in the guide sleeve 50 and then further forwardly into tapering guide channel 65, wherein the reinforcing material M may assume an overlapping circular configuration with the progressively reducing diameter of channel 65 in progressing axially forwardly therein. The inner flow pipe 60 has a plurality of and preferably four circumferentially spaced forward adjusting screws 66 which project adjustable distances radially inwardly of the flow pipe 60. The rear of the flow pipe 60 or the mouth 54 of guide sleeve 50 may similarly have a plurality of and preferably four circumferentially spaced rear adjusting screws 67 which also project adjustable distances radially inwardly of the flow pipe 60 or the mouth 54 for a purpose to be hereinafter detailed.

The polymeric compound and reinforcing material guide assembly 35 is maintained within housing 14 during actuation of extrusion head 11 by an annular end plate 70 which is attached to the rear end 16 of housing 14, as by a plurality of circumferentially spaced machine screws 71. The annular end plate 70 extends radially inwardly a sufficient distance such as to overlap a portion of the rear of rear material guide sleeve 50 without blocking access to the channel 51 rearwardly of the rear material guide sleeve 50. One or more machine screws 72 may be inserted through the annular end plate 70 into the rear material guide sleeve 50 to maintain it selectively positioned within housing 14 in the manner depicted in FIG. 1 of the drawings..Extending centrally of the throughbore 21 of housing 14 is a center mechanism, generally indicated by the numeral 75. The center mechanism 75 extends through and is supported by a bore 56 in rear material guide sleeve 50 which has threads 57 over a portion of its extent. The center mechanism 75 includes a center pin 76 which extends substantially the length of housing 14 and particularly from a position rearwardly of the annular end plate 70 to a position forwardly of throughbore 21 in housing 14. The center pin 76 is supported in a position precisely centrally of the throughbore 21 of housing 14 by an elongate cylindrical support tube 77. The support tube 77 is rearwardly threaded at 78 to engage the threads 57 in the bore 56 of the rear material guide sleeve 50 and projects forwardly a substantial distance into the mouth 54 of guide sleeve 50 and thence into the tapered portion 21" of throughbore 21 which houses the forward material guide sleeve 36. It will thus be appreciated that the support tube 77 provides support to the center pin 76 over a substantial portion of its length to maintain the center pin 76 accurately and rigidly positioned within the housing 14.

The center pin 76 is also supported in a bore 79 in a stud 80 which is threaded into the threads 57 in bore 56 of the rear material guide sleeve 50. A spacer 81 and a washer 82 may be threaded on the stud 80 rearwardly of the rear surface of the rear material guide sleeve 50. The center pin 76 has threads 83 proximate the rear extremity thereof for engagement by a nut 84 which may be tightened against the head of stud 80 to temporarily rigidly fix the center pin 76 at any desired axial position relative to the housing 14.

The forward extremity of center pin 76 opposite the threads 83 at the rear extremity is provided with threads 83' for receiving an inner die 85 which is attached to the center pin by threads 86 which engage the threads 83' for selective mounting and demounting of inner die 85 on the center pin 76. The inner die has radially outwardly a die face 87 and a tapering rearwardly positioned leading face 88. Thus, it will be appreciated that polymeric compounds supplied from extruder 12 through opening 52, curved portion 53 and mouth 54 is directed forwardly between the inner flow pipe 60 and the center pin 76 in what constitutes an inner polymer channel 90. The channel 90 terminates forwardly between the point 62 of inner flow pipe 60 and the leading face 88 which proceeds to die face 87 of the inner die 85. It will thus be appreciated that axial adjustment of the center pin 76 as effected by altering the position of nut 84 on threads 83' will control the position of the point 62 of inner flow pipe 60 to establish the desired axial thickness of the inner polymer compound of the tubing T being extruded. Significantly, it is to be noted that this thickness adjustment of the inner polymer compound can be effected strictly by adjustment of nut 84 which is located rearwardly of the housing 14. Due to this advantageous arrangement, it is therefore possible to effect desired adjustments in this respect without discontinuing operation of the extruders 12, 13 or without clearing away tubing T which may be located forwardly of the inner die 85.

It is also to be appreciated from the description hereinabove that the adjusting screws 66 and 67 in inner flow pipe 60 and mouth 54 of guide sleeve 50 may be appropriately adjusted relative to center pin 76 and support tube 77 such as to adjust for absolute circumstantial concentricity of the inner polymeric channel 90. In this way the resultant tubing T has an inner polymeric compound which is of uniform thickness about the entire circumference thereof.

The center pin 76 is advantageously provided with a bore 91 which extends the full length thereof, i.e., from the end having inner die 85 to the rear end having the threads 83. With the forward opening of bore 91 within the tubing T, it is possible to supply a fluid such as compressed air from the rearward extremity of center pin 76 interiorly of the tubing T being emitted around the inner die 85 such as to maintain the tubing T in its extruded configuration after departing the die area or if desired subsequently while the tubing T may undergo a curing process. Persons skilled in the art will be aware of a variety of continuous curing processes for polymeric materials of the types commonly employed in tubing and hosing applications.

It is to be appreciated that the axially outer side of point 62 of inner flow pipe 60 defines the termination of reinforcing material guide channel 65 wherein the reinforcing material is emitted to be positioned radially outwardly on the inner polymeric compound as it engages the die face 87 of inner die 85. It is to be noted that the guide bushing 40 may extend slightly axially forwardly of the point 62 of inner flow pipe 60, such that the reinforcing material M may be compressed against the inner surface 42 of material guide bushing 40 for a short axial distance after the reinforcing material M and the inner polymeric compound from channel 90 are joined at the axial extremity of point 62.

The outer polymeric compound of the tubing T is supplied through extruder 13, bore 30 and outer polymer channel 45. The disposition of the outer polymeric material is controlled radially inwardly thereof by the beveled surface 43 of the guide bushing 40. The outer polymeric compound is controlled radially outwardly thereof by an outer die assembly, generally indicated by the numeral 100. The outer die assembly 100 consists of an outer die 101 which has a die face 101' defining the outer surface of the tubing T and particularly the outer polymeric compound. The outer die 101 is mounted on a die holder 102 which, with the other components of outer die assembly 100, is positioned in the bore 20 in the front end 15 of housing 14. The concentricity of the outer die 101 of outer die assembly 100 relative to the inner die 85 and the material guide bushing 40 is established by a plurality of centering studs 103 which extend through threads 104 in the housing 14 and abut the radially outer surface of the die holder 102. As best seen in FIG. 2 there are preferably four studs 103 which may be appropriately radially adjusted to position die holder 102 and thence die 101 such that the die face 101' is positioned to produce an outer polymeric compound thickness of the tubing T which is radially uniform circumferentially about tubing T. It will be appreciated that this adjustment can be readily made even during operation of the extruder head 11. Once suitable adjustment has been made to the radial positioning of the die holder 102 an outer ring nut 105 which engages threads 106 in the housing 14 operates as a jam nut to lock the die holder 102 in fixed position relative to the housing 14. It will thus be appreciated that further adjustment can be effected merely by loosening the outer ring nut 105, effecting any necessary adjustment to appropriate studs 103 of the entire group of centering studs 103, followed by a retightening of the outer ring nut 105.

The axial position of the outer die 101 relative to guide bushing 40 controls the radial thickness of the outer polymeric compound of the tubing T. The outer die holder 102 carrying the outer die 101 is axially positioned relative to the die holder 102 and the other die component by virtue of an inner ring nut 110 which axially abuts the outer die 101 and has threads 111 which engage with threads 112 located on the die holder 102. Thus, the threaded adjustment of the inner ring nut 110 effects the desired axial positioning of the outer die 101.

Thus it should be evident that the extruder head 11 for manufacturing polymeric tubing T containing a reinforcing material M disclosed herein carries out the various objects of the invention set forth hereinabove and otherwise constitutes an advantageous contribution to the art. As may be apparent to persons skilled in the art, modifications may be made to the preferred embodiment disclosed herein without departing from the spirit of the invention. The scope of the invention being limited solely by the scope of the attached claims.

We claim:

1. Apparatus for manufacturing polymeric tubing containing a reinforcing material enclosed between first and second polymeric compounds including an extrusion head comprising, elongate housing means, bore means extending from a front end of said housing means to a rear end of said housing means, rear material guide sleeve means fixed in said bore means proximate said rear end of said housing means and having channel means for passing reinforcing material, forward material guide sleeve means fixed in said bore means proximate said front end of said housing means for radially outwardly constraining passing reinforcing material, center pin means extending substantially the length of said housing means and located centrally of said bore means thereof, flow pipe means extending from said rear material guide sleeve means and forming inner channel means supplying a first polymeric compound, means for adjusting the concentricity of said flow pipe means relative to said center pin means, outer channel means supplying a second polymeric compound, and adjustable die means controlling the interior and exterior dimensions of the first and second polymeric compounds as the polymeric tubing is extruded.

2. Apparatus according to claim 1, wherein said means for adjusting the concentricity of said flow pipe means relative to said center pin means are located proximate the axial extremities of said flow pipe means.

3. Apparatus according to claim 2, wherein said means for adjusting the concentricity of said flow pipe means relative to said center pin means includes a plurality of adjusting screws positioned circumferentially about said flow pipe means.

4. Apparatus according to claim 3, wherein said adjusting screws are housed in and extend radially inwardly of said pipe means for engaging said center pin means.

5. Apparatus according to claim 1, wherein said die means includes inner die means controlling the wall thickness of the first polymeric compound of the tubing.

6. Apparatus according to claim 5, wherein said die means includes outer die means axially and radially adjustable relative to said housing means and said inner die means to control the wall thickness of the second polymeric compound about the entire periphery of the tubing.

7. Apparatus according to claim 5, including means for adjustably positioning said inner die means axially of said housing means from said rear end of said housing means.

8. Apparatus according to claim 7, wherein said inner die means threadably interengages said center pin means for selective assembly for operation of and disassembly for cleaning of the extrusion head.

9. Apparatus according to claim 8, wherein said center pin means extends through a stud attached to said rear material guide sleeve means and has a threaded portion at the rear extremity engaging nut means.

10. Apparatus according to claim 1, wherein tube means extends forward from said rear material guide sleeve means for supporting and aligning said center pin means relative to said housing means.

11. Apparatus according to claim 10, wherein said tube means threadably interengages said rear material guide sleeve and extends forward into said flow pipe means.

12. Apparatus according to claim 10, wherein certain of said means for adjusting the concentricity of said flow pipe means relative to said center pin means engage said tube means.

13. Apparatus according to claim 1, wherein said center pin means has a through bore for supplying fluid interiorly of the polymeric tubing for maintaining the extruded configuration of the tubing subsequent to leaving the extrusion head.

14. Apparatus according to claim 1, including first and second extruder means supplying the first and second polymeric compounds from positions along said housing means displaced a relatively short axial distance from said die means.

15. Apparatus according to claim 1, including an annular end plate abutting said rear end of said housing means and overlying said rear material guide sleeve means.

16. Apparatus according to claim 15, wherein machine screws attach said annular end plate to said housing means and maintain said rear material guide sleeve means in fixed position relative to said housing means.

17. Apparatus according to claim 1, wherein said forward material guide sleeve means has at its forward end a material guide bushing detachably affixed thereto for providing radially outward constraint of the reinforcing material and radially inward constraint of the second polymeric compound.

18. Apparatus according to claim 17, wherein said flow pipe extends to a point, said material guide bushing extending axially forwardly of said point of said flow pipe.

19. Apparatus according to claim 1, wherein said die means includes an outer die supported by a die holder, a plurality of centering studs extending through said housing means for adjustably radially positioning said die holder and said outer die, and an outer ring nut threadably interengaging said housing means and clamping said die holder and said outer die at a selected radial position.

20. Apparatus according to claim 19, wherein said die means includes an inner ring nut for controlling the axial position of said outer die.

* * * * *